Patented Jan. 5, 1937

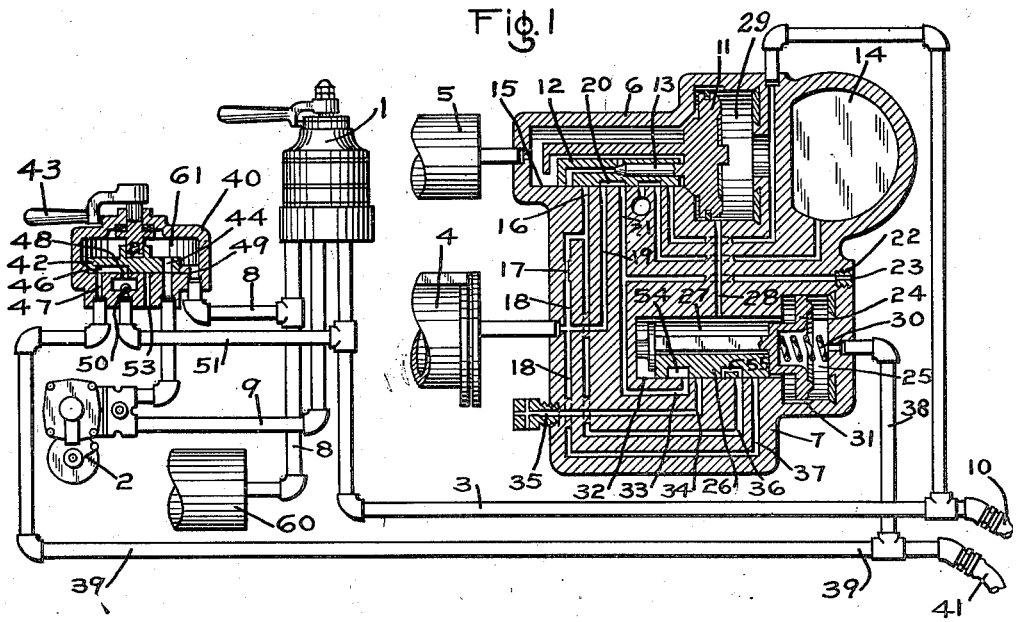
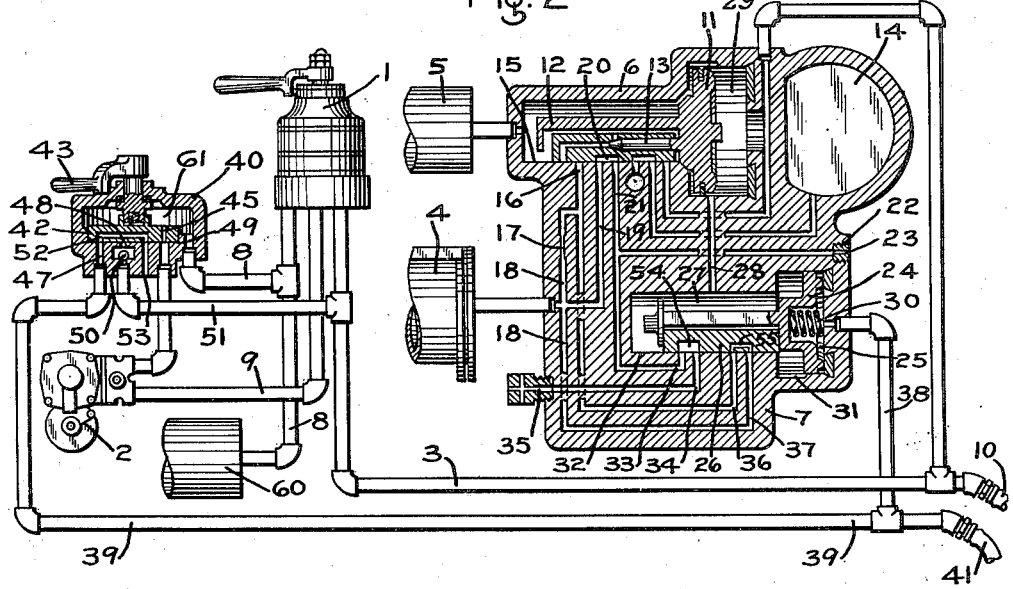
INVENTOR.
ANSELME NEVEU
By *Wm. M. Cody*
ATTORNEY.

2,066,573

UNITED STATES PATENT OFFICE 2,066,573

FLUID PRESSURE BRAKE

Anselme Neveu, Livry-Gargan, France, assignor to The Westinghouse Air Brake Company, Wilmerding, Pa., a corporation of Pennsylvania Application August 15, 1931, Serial No. 557,228. In France October 18, 1930. Renewed January 24, 1936.

14 Claims. (Cl. 303—23)

This invention relates to fluid pressure braking apparatus of the kind comprising a triple or distributing valve adapted to control the supply of fluid under pressure to and its release from the brake cylinder in accordance with variations in brake pipe pressure.

For various reasons the triple or distributing valves employed in vehicles for passenger traffic differ from those employed in vehicles for freight traffic more particularly as regards the rate at which fluid is to be supplied to and its release from the brake cylinder during the application and release of the brakes of a train, and the capacity of the supply and exhaust ports or passages in the triple or distributing valves are therefore determined in accordance with the type of vehicle on which they are mounted.

Certain vehicles, more particularly locomotives and tenders, are, however, employed in connection with trains of either type, and the triple or distributing valves on such vehicles are accordingly adapted to be adjusted for passenger or freight trains in accordance with the kind of train with which they are for the time being associated. It has hitherto been customary for this purpose to provide the triple or distributing valve on such vehicles with a change-over cock adapted to be manually adjusted to one or other of two positions for freight and passenger service respectively, so as to effect the desired change of the rate of the supply of fluid to and its release from the brake cylinder of the vehicle.

There is, however, a risk of such adjustment being omitted when a locomotive and tender for example is transferred from one type of train to the other, and the primary object of the invention is to provide an improved construction of triple or distributing valve comprising a changeover device adapted to be adjusted by means of fluid under pressure controlled from any suitable point, such, for example, as the cab of the locomotive.

Another necessary variation to be effected according to whether a locomotive is being employed for freight or passenger service relates to the supply of fluid under pressure to the brake pipe of the train during normal running, since owing to the greater length of freight trains the passage for the supply of fluid to the brake pipe through the usual feed valve should be of greater capacity in the case of a freight train than in the case of a passenger train. Furthermore, unless the capacity of the feed pipe is reduced in the case of passenger traffic, there is a danger of a local venting of fluid from the brake pipe, for instance by means of the emergency valve usually provided on certain vehicles, being ineffective as regards producing an application of the brakes throughout the train, owing to the brake pipe pressure being maintained by the feed valve, even when the emergency valve is opened, except in the immediate vicinity of this valve.

According to a further feature of the invention, the adjustment of the rate of supply of fluid to the brake pipe in accordance with the character of the train is also arranged to be effected from the point of control, preferably by means of a valve device which also effects the desired control of the adjustment above referred to of the change-over devices of the triple or distributing valves on the locomotive and tender or other vehicles of the train.

The invention is illustrated by way of example in the accompanying drawing, of which Figure 1 is a diagrammatic sectional view of the braking apparatus on a locomotive constructed in accordance with one form of the invention, the various parts of the apparatus being shown as adjusted for freight traffic, Figure 2 being a similar view showing the apparatus adjusted for passenger traffic.

Referring now to the drawing, it will be seen that the braking apparatus comprises a driver's brake valve 1, feed valve 2, brake pipe 3, brake cylinder 4, auxiliary reservoir 5 and a triple valve device 6 comprising a change-over valve device 7 in the lower portion of the triple valve device 6.

The driver's brake valve 1 is of the usual construction adapted to control communication between a pipe 8 leading to the main reservoir 60 and the brake pipe 3, the brake valve 1 also controlling communication in the usual manner with a pipe 9 leading to the feed valve 2 and with the atmosphere.

The brake pipe 3 on the locomotive is arranged to be connected by means of the usual hose coupling 10 with the brake pipe extending throughout the remaining vehicles of the train.

The triple valve 6 comprises the usual piston 11 adapted to operate a slide valve 12 and a graduating valve 13, together with an accelerating bulb or chamber 14 for effecting a rapid propagation of the braking action throughout the train. The seat 15 of the triple valve slide valve 12 is provided with the usual service port and passage 16, communicating by means of a restricted orifice 17 with a passage 18 leading to the brake cylinder 4. The passage 18 also communicates with a passage 19, which, in the release position of the triple valve shown in the drawing, communicates by means of a cavity 20 in the slide valve 12 with an atmospheric exhaust passage 21 provided with a restricted outlet through choke plug 22.

The change-over valve device 7 comprises a piston 24 adapted to move in a piston chamber 25 and to operate a slide valve 26 contained in a valve chamber 27 communicating by means of a passage 28 with the piston chamber 29 of the triple valve device 6. The piston 24 is provided with a controlling spring 30 and a leakage groove 31, and the valve seat 32 of the slide valve 26 is provided with a port 33 leading to the passage 21, a port and passage 34 leading to an unrestricted atmospheric outlet 35, a port 36 leading to the passage 16 and a port 37 leading to the passage 18. The piston chamber 25 of the change-over valve device 7 is in communication by means of a pipe 38 with an auxiliary brake pipe 39 extending to a driver's change-over valve 40, preferably arranged in the cab of the locomotive adjacent the driver's brake valve 1.

The auxiliary brake pipe 39 is provided with a hose coupling 41, by means of which the auxiliary brake pipe 39 can be connected to a similar auxiliary brake pipe provided on the locomotive tender or other vehicle having a triple valve device provided with a change-over valve device, similar to that indicated at 6.

The driver's change-over valve 40 comprises a pressure chamber 61 in open communication with the main reservoir pipe 8 and a rotary valve 42 adapted to be operated by means of a handle 43. The rotary valve 42 is provided with a relatively large through port 44 and a restricted through port 45 (see Figure 2), this valve being also provided with a cavity 46 adapted to co-operate with ports 47 and 48 in the valve seat 49 of the valve 42. The port 47 communicates with the auxiliary brake pipe 39, while the port 48 communicates through a non-return valve 50 with a pipe 51 leading to the brake pipe 3. The valve 42 is also provided with another cavity 52 (see Figure 2) adapted to establish communication between the port 47 and an atmospheric port 53 in the valve seat 49.

The operation of the apparatus is as follows:

The locomotive provided with the apparatus shown in the drawing is coupled up to the tender and other vehicles of the train in the usual manner, the hose coupling 10 being coupled to the corresponding hose coupling of the tender, while the hose coupling 41 is coupled to the corresponding hose coupling on the auxiliary brake pipe of the tender.

In the case in which a locomotive is coupled to a freight train, the driver's change-over valve is adjusted to the freight position shown in Figure 1, communication being thereby established between the brake pipe 3 and the auxiliary brake pipe 39 by way of the pipe 51, non-return valve 50, port 48, cavity 46 and port 47. Fluid under pressure is thus supplied from the brake pipe 3 to the auxiliary brake pipe 39 and thence by way of the pipe 38 to the piston chamber 25 of the change-over valve 7. The valve chamber 27 of the change-over valve 7 is thereby charged with fluid at brake pipe pressure through the leakage groove 31 and also from the piston chamber 29 through the passage 28.

The pressures on opposite sides of the piston 24 being thus balanced, the piston 24 is maintained in its left-hand position as shown under the action of the controlling spring 30, and it will be seen that in this position the ports in the valve seat 32 of the change-over valve 7 are blanked.

When a reduction in brake pipe pressure is effected in order to cause an application of the brakes, fluid under pressure is supplied from the auxiliary reservoir in the usual manner to the brake cylinder 4 by way of the port and passage 16, the restricted orifice 17 and the pipe 18, whereas during the release of the brakes fluid under pressure is vented from the brake cylinder 4 by way of the passage 19, cavity 20 in the slide valve 12, passage 21 and the restricted outlet 23. The supply of fluid to and its release from the brake cylinder 4 is thus, under these conditions, effected at a restricted rate suitable for freight service controlled by the restricted aperture 17 and the restricted outlet 23.

Furthermore, owing to the setting of the driver's change-over valve 40, fluid under pressure is supplied from the main reservoir pipe 8 and pressure chamber 61 to the feed valve 2 through the relatively large port 44 in the valve 42, so that the rate of feed of the fluid under pressure to the brake pipe 3 is relatively high.

In the event of the locomotive being coupled to a passenger train, the driver's change-over valve 40 is adjusted by means of its handle 43 to the position shown in Figure 2, in which communication is established between the auxiliary brake pipe 39 and the atmosphere through the port 47, cavity 52 and atmospheric port 53.

The piston chamber 25 of the change-over valve device 7 is thus vented to the atmosphere, with the result that the fluid at brake pipe pressure in the valve chamber 27 causes the piston 24 to move to its right-hand position shown in Figure 2 compressing the spring 30. The slide valve 26 is correspondingly moved, with the result that the ports 33 and 34 register with a cavity 54 in the slide valve 26, while the ports 36 and 37 register with a cavity 55 in the slide valve 26.

During an application of the brakes, fluid under pressure is, under these conditions, supplied from the auxiliary reservoir 5 to the brake cylinder 4, not only through the restricted passage 17, as in the case of a freight train, but also from the pipe and passage 16 through port 36, cavity 55, port 37 and passage 18 to the brake cylinder 4, so that fluid under pressure is supplied to the brake cylinder at a higher rate than in freight service. Similarly, during the release of the brakes, fluid under pressure is released from the brake cylinder 4, not only by way of the restricted outlet 23, but also from passage 21 through port 33, cavity 54 and port 34 to the relatively unrestricted atmospheric port 35, so that the release of the brakes is correspondingly facilitated.

Furthermore, owing to the adjustment of the driver's change-over valve 40, the supply of fluid from the main reservoir pipe 8 to the feed valve 2 is effected through the restricted through port 45 in the valve 42. Consequently, the rate of supply of fluid under pressure to the brake pipe 3 is relatively restricted, and in the event of a local venting of the brake pipe, by means, for instance, of an emergency valve, at any point of the train, this is effective as regards producing a reduction in brake pipe pressure, in spite of the action of the feed valve 2 tending to restore this pressure.

It will be understood that the supply of fluid under pressure to the valve chamber 27 of the change-over valve 7 is, when the apparatus is adjusted as shown in Figure 2, effected through the passage 28 from the piston chamber 29, when the triple valve piston 11 is in its release position, or from the auxiliary reservoir 5 through the valve chamber of the triple valve during an application of the brakes.

During freight service, in the event of leakage of fluid from the auxiliary brake pipe 39, as, for instance, by damage to the hose coupling 41, the change-over valve device 7 will be moved to the position shown in Figure 2, so that the conditions as regards application and release of the brakes will become those for passenger service.

It will be understood that the locomotive tender is provided with a triple valve device comprisng a change-over valve device similar to that shown in the drawing as provided for the locomotive, and that any other vehicle provided with a triple valve and change-over valve as above described may be arranged to be automatically set from freight to passenger conditions and vice versa by operating the driver's change-over valve 40.

The invention is evidently not limited to the particular construction and arrangement of the parts above described and illustrated by way of example, which may be varied in many respects without exceeding the scope of the invention.

Having now described my invention, what I claim as new and desire to secure by Letters Patent, is:

1. In a fluid pressure brake equipment, the combination with a brake cylinder and a brake controlling valve device for controlling the admission and release of fluid under pressure to and from the brake cylinder, of a regulating valve device operated by variations in fluid pressure and adapted in one position to restrict communication through which fluid is supplied to and released from the brake cylinder by said controlling valve device and in another position to provide communication of greater capacity through which fluid is supplied to and released from the brake cylinder, and means for varying the fluid pressure on said regulating valve device.

2. In a fluid pressure brake equipment, the combination with a brake pipe, a brake cylinder and a brake controlling valve device operated upon a reduction in brake pipe pressure for supplying fluid under pressure to the brake cylinder, of a feed valve device for supplying fluid under pressure to the brake pipe, and means operable to vary the rate at which said feed valve device supplies fluid to the brake pipe and the rate at which said controlling valve device supplies fluid to the brake cylinder.

3. In a fluid pressure brake equipment, the combination with a brake pipe, a brake cylinder and a brake controlling valve device operated upon a reduction in brake pipe pressure for supplying fluid under pressure to the brake cylinder, of a feed valve device for supplying fluid under pressure to the brake pipe, a regulating valve device operated by variations in fluid pressure for varying the rate at which said controlling valve device supplies fluid to the brake cylinder, and a manually operated valve device for varying the fluid pressure on said regulating valve device and for controlling the rate at which said feed valve device supplies fluid under pressure to the brake pipe.

4. In a fluid pressure brake equipment, the combination with a brake pipe and a brake controlling valve device operated by variations in brake pipe pressure to control the brakes for either one of two classes of service, of adjusting means operated by variations in fluid pressure for causing said valve device to control the brakes for either class of service, an auxiliary control pipe separate from the brake pipe and through which said adjusting means is subjected to variations in fluid pressure, and manually operable means for varying the fluid pressure in said auxiliary control pipe, whereby the operator may at all times effect the operation of said valve means while the brake pipe pressure remains undisturbed.

5. In a fluid pressure brake equipment, the combination with a brake pipe, a brake cylinder, and a brake controlling valve device operative by variations in brake pipe pressure to control the supply of fluid under pressure to the brake cylinder, of valve means operated by variations in fluid pressure for varying the rate at which said valve device supplies fluid to the brake cylinder, an auxiliary control pipe separate from the brake pipe and through which said valve means is subjected to variations in fluid pressure, and manually operated means for varying the fluid pressure in said auxiliary control pipe so that the operator may at all times control the operation of said valve means while the brake pipe pressure remains constant.

6. In a fluid pressure brake equipment, the combination with a brake pipe, a brake cylinder and a brake controlling valve device operative by variations in brake pipe pressure to control the supply of fluid under pressure to the brake cylinder, of a regulating valve device operated by variations in fluid pressure for adjusting the rate at which said controlling valve device supplies fluid to the brake cylinder to either a slow or a more rapid rate, an auxiliary control pipe separate from the brake pipe and through which said regulating valve device is subjected to variations in fluid pressure, and manually operable means at all times under the control of the operator for varying the fluid pressure in said auxiliary control pipe.

7. In a fluid pressure brake equipment adapted to be conditioned for any one of a plurality of classes of train service, in combination, a brake pipe, a single brake controlling valve device operated by variations in brake pipe pressure to control the brakes in each of said classes of train service, a control communication adapted to carry fluid at a pressure varying according to the class of service in which the equipment is employed, and means operative according to the pressure of fluid carried in said communication for correspondingly modifying the control of the brakes as effected by the brake controlling valve device.

8. In a fluid pressure brake equipment adapted to be conditioned for any one of a plurality of classes of train service, in combination, a brake pipe, a single brake controlling valve device operated by variations in brake pipe pressure to control the brakes in each of said classes of train service, a control communication adapted to carry fluid at one pressure in one class of train service and at another pressure in another class of train service, and means positioned according to the pressure of fluid carried in said communication for correspondingly modifying the control of the brakes as effected by the brake controlling valve device.

9. In a fluid pressure brake equipment adapted to be conditioned for any one of a plurality of classes of train service, in combination, a brake pipe, a single brake controlling valve device operated by variations in brake pipe pressure to control the brakes in each of said classes of train service, a control communication separate from said brake pipe and adapted to carry fluid at one pressure in one class of train service and at another pressure in another class of train service, and means operative according to the pressure of fluid carried in said communication for correspondingly modifying the control of the brakes as effected by the brake controlling valve device.

10. In a fluid pressure brake equipment adapted to be conditioned for any one of a plurality of classes of train service, in combination, a brake pipe, a single brake controlling valve device operated by variations in brake pipe pressure to control the brakes in each of said classes of train service, a control communication adapted to carry fluid at a pressure varying according to the class of service in which the equipment is employed, valve means operative to modify the control of the brakes as effected by the brake controlling valve device and having a control position for each class of train service, and means operative according to the pressure of fluid carried in said communication for positioning said valve means.

11. In a fluid pressure brake equipment adapted to be conditioned for any one of a plurality of classes of train service, in combination, a brake pipe, a single brake controlling valve device operated by variations in brake pipe pressure to control the brakes in each of said classes of train service, a control communication adapted to carry fluid at a pressure varying according to the class of service in which the equipment is employed, valve means operative to one position to provide for certain control of the brakes as effected by the brake controlling valve device in one class of train service and operative to another position to modify the control of the brakes as effected by the brake controlling valve device in another class of train service, and means operative according to the pressure of fluid carried in said communication for positioning said valve means.

12. In a fluid pressure brake equipment, in combination, a brake pipe, a single brake controlling valve device operated by variations in brake pipe pressure to control the brakes for any one of a plurality of classes of train service, means operated by variations in fluid pressure for regulating the control of the brakes, as effected by the brake controlling valve device, for any one of said classes of service, and a communication through which the pressure of fluid acting on said means is adapted to be varied according to the class of train service in which the equipment is employed.

13. In a fluid pressure brake equipment, in combination, a brake pipe, a brake controlling valve device operated by variations in brake pipe pressure to control the brakes for any one of a plurality of classes of train service, a control communication adapted in one class of train service to carry fluid at atmospheric pressure and adapted in another class of train service to carry fluid at a higher pressure, and means operative according to the pressure of fluid carried in said communication for conditioning the brake controlling valve device for the control of the brakes in the class of train service in which the brake equipment is employed.

14. In a fluid pressure brake equipment, in combination, a brake pipe, a single brake controlling valve device operated by variations in brake pipe pressure to control the brakes for any one of a plurality of classes of train service, a control communication adapted in one class of train service to carry fluid at a certain pressure and adapted in another class of train service to carry fluid at a higher pressure, and means operative according to the pressure of fluid carried in said communication for correspondingly modifying the control of the brakes as effected by the brake controlling valve device.

ANSELME NEVEU.